UNITED STATES PATENT OFFICE.

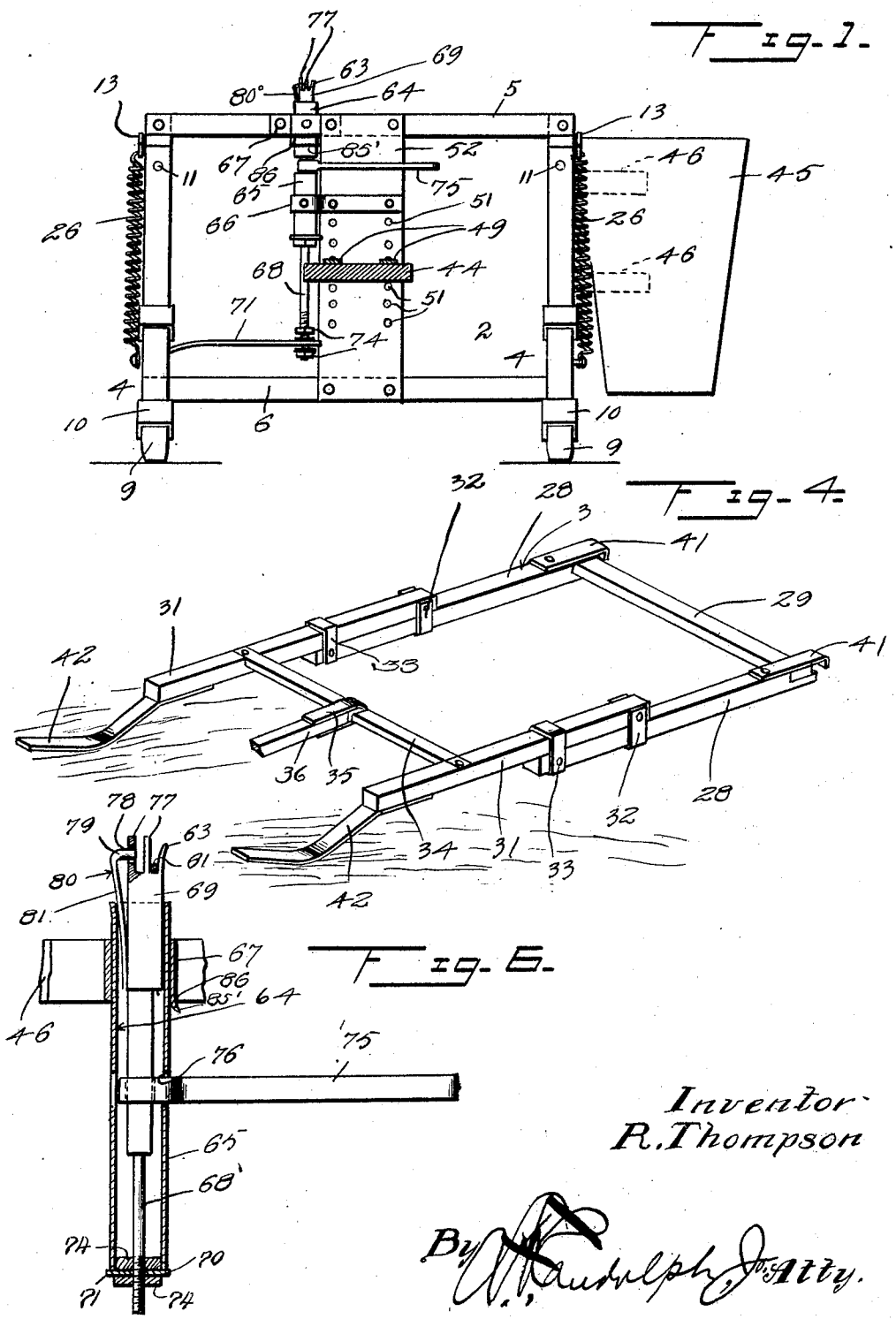

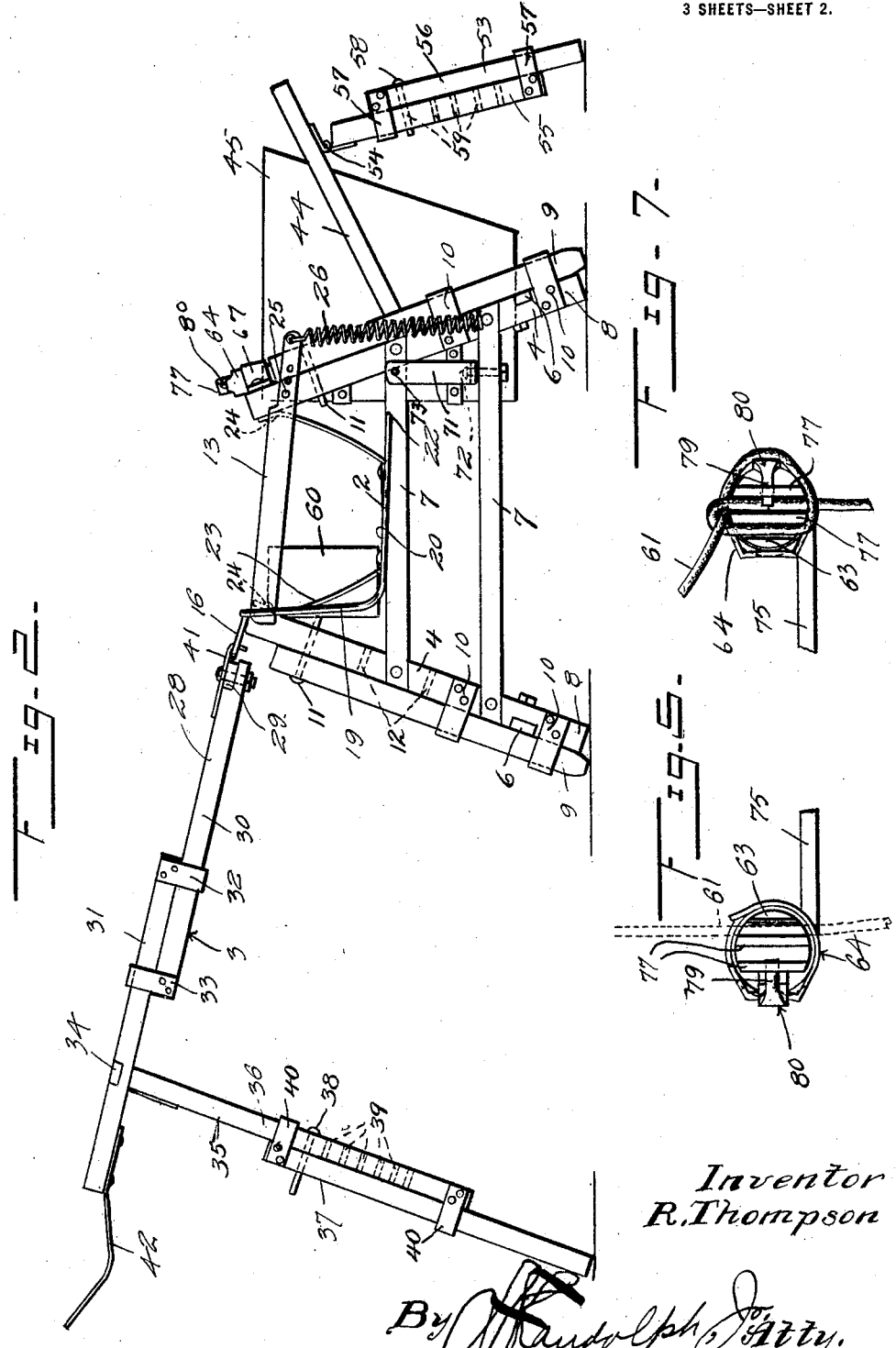

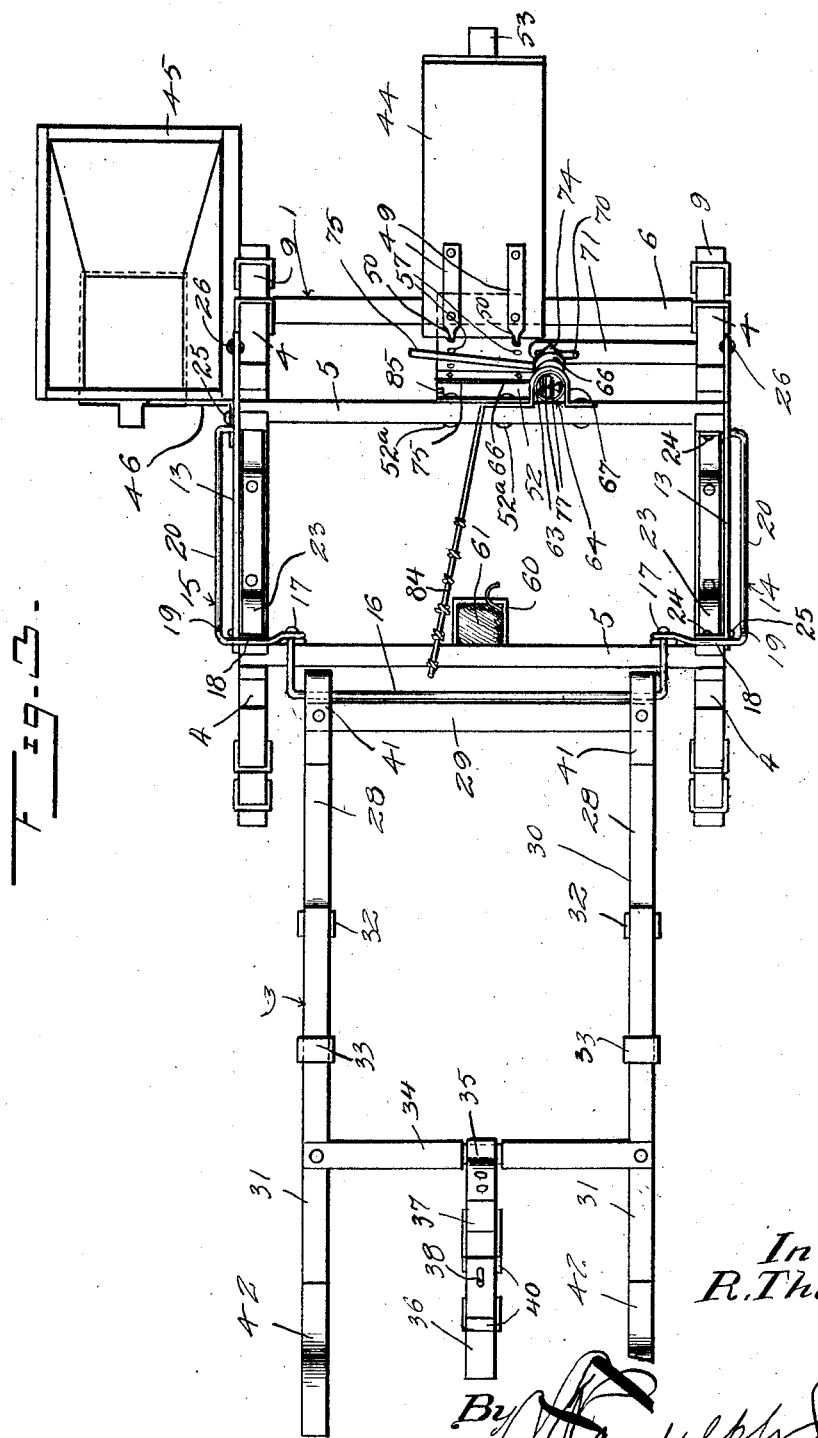

ROBERT THOMPSON, OF BAKERSTOWN, PENNSYLVANIA.

CORN-HUSKING TABLE.

1,393,648.   Specification of Letters Patent.   Patented Oct. 11, 1921.

Application filed May 23, 1919. Serial No. 299,081.

*To all whom it may concern:*

Be it known that I, ROBERT THOMPSON, a citizen of the United States, residing at Bakerstown, in the county of Allegheny and State of Pennsylvania, have invented certain new and useful Improvements in Corn-Husking Tables; and I do hereby declare the following to be a full, clear, and exact description of the invention, such as will enable others skilled in the art to which it appertains to make and use the same.

This invention relates to corn husking tables and the primary object of the invention is to provide an improved table for receiving corn stalks as they are brought from the field, so that the ears of corn can be readily and quickly removed therefrom.

Another object of the invention is to provide an improved table for receiving the stalks of corn as they are brought from the field so that the same can be quickly and readily tied into shocks and transported to the desired place.

A further object of the invention is to provide means in a device of the above character whereby the binding cord is firmly held in position so that the same can be quickly and readily tied when desired.

A further object of the invention is to provide an improved means for holding the bundle of corn stalks tight while the binding cord is being secured thereon.

A further object of the invention is to provide an improved means for looping one end of the cord, so that the binding cord may be quickly placed in position on the shock and firmly tied in such position.

A further object of the invention is to provide a resilient seat for the corn stalks, so that the new stalks falling on the seat will always be in convenient position, whereby the ears of corn may be readily stripped therefrom.

A further object of the invention is to provide an improved device of the above character which can be readily adjusted so as to regulate the flow of the corn stalks to the resilient seat and to also adjust the height of the table to conform to the stature of the operator.

A further object of the invention is to provide means whereby the field drag for conveying the corn stalks from the cornfield may be quickly and readily attached to the table and elevated to the desired position, so as to prevent the necessity of transporting the corn stalks from the field carrier to the table.

A still further object of the invention is to provide an improved device of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof in which:

Figure 1 is a front elevation of the improved corn husking table,

Fig. 2 is a side elevation of the same,

Fig. 3 is a top plan view of the device,

Fig. 4 is a detail view of the field drag removed from the table,

Fig. 5 is an enlarged detail view of the device for forming loops in the binding cord, Fig. 6 is a vertical section through the same, and Fig. 7 is an enlarged detail view partly in section showing a loop being formed on the looper.

Referring to the drawings, in detail wherein similar reference characters designate corresponding parts, throughout the several views, the numeral 1 generally indicates the improved device, which includes the table proper 2 and the field drag 3 for conveying the corn stalks from the field to the table 2. The table proper includes the inclined supporting legs 4 which are connected by upper and lower longitudinally extending bars 5 and 6 and by transverse bars 7. The legs, as stated, are inclined upwardly toward each other, so as to form a relatively broad bearing surface for engaging the ground, so as to prevent the tipping over of the table. Each of the legs 4 includes the stationary members 8, and the movable members 9 which are slidably supported on the stationary members by guide loops 10 riveted or otherwise secured to the stationary members. The movable members are held in adjusted position by means of a bolt 11, which is adapted to extend through any one of a plurality of spaced openings 12 formed in the stationary member. Thus the height of the table can be readily regulated by removing the bolt and sliding the movable member to the desired height and reinserting the bolt in another recess. The forward legs 4 have pivotally secured to their outer surfaces the corn stalk supporting members 13, which extend forwardly from the forward legs toward the rear legs and the same are guided in their swinging movement by means of wire guides 14 and 15 which are connected by a central rearwardly extending U-shaped member 16. The guides 14 and 15 and the U-shaped member 16 are formed of a single strand of wire and the legs of the U-shaped member are bent downwardly and coiled around retaining pins 17 and the same are then bent outwardly, as at 18, and downwardly in spaced relation to the sides of the table, as at 19, and then forwardly, as at 20, and have their free ends secured, as at 22, to one of the upper transverse bars 7. The transverse bars also support the substantially U-shaped fodder receiving members 23 which have their legs inclined outwardly in opposite directions and secured to the upper terminals of the supporting legs 4, as at 24. It will be seen that as the fodder falls on the members 13, the same will be swung downward on their pivots and the members 23 then receive and hold the same in position. The members 23 permit the stalks to be conveniently tied in position. The members 13 are pivotally held in position by means of pivot pins 25, which extend through the members adjacent to the rear ends thereof and the members are normally held in raised position by means of the contractile coil springs 26 which have their upper ends secured to the outer extreme ends of the members 13 and their lower ends to the supporting legs 4 adjacent the lower ends thereof. The outer ends of the members 13 have a plurality of openings formed therein for receiving the upper terminal of the coil springs 26, so that the same can be placed in any one of the openings and thus regulate the tension of the springs, so that the members 13 can be regulated according to whether the fodder being handled is a light or heavy grade.

The field drag 3 includes the longitudinally extending spaced bars 28, which are connected at the forward ends by a transverse bar 29. The longitudinally extending bars are formed of a pair of extensible sections 30 and 31 and the same are slidably connected together by means of cuffs 32 and 33 which are carried by the opposite ends of the sections 31 and 30. The sections 31 have their rear ends connected by a transverse bar 34, which pivotally carries a supporting leg 35 which is also made in two sections 36 and 37, so that the height of this leg may be readily regulated and thus adjust the inclination of the drag to the table proper. The leg is held in adjusted position by means of a bolt 38 extending through the section 36 and arranged to engage in any one of a plurality of spaced openings 39 formed in the sections 35. The sections are slidably connected together by means of the cuffs 40 which are connected to the opposite terminals of the section. The forward ends of the longitudinally extending members 28 have connected thereto outwardly extending hooks 41 which are adapted to engage the bight portion of the U-shaped member 16 so that the drag can be readily connected to the table after the same has been brought from the field loaded with corn stalks. The rear terminals of the sections 31 have the rearwardly and downwardly extending runners 42 secured thereto for engaging the ground, when the drag is being used to haul the corn stalks from the field and the forward end is then slightly elevated and attached by suitable means to the swingletree of the horse's harness or grasped by the hands of the operator and dragged through the field. When the drag has been filled with the corn stalks and brought to the table, the front ends thereof are elevated and the hooks 41 placed over the U-shaped member 16 and the leg 35 is adjusted so as to elevate the drag to the desired height for permitting the corn stalks to roll therefrom to the members 13. As the corn stalks roll on the members 13 the operator sitting on the seat 44 near the forward portion of the machine tears the ears of corn from the husks and drops the same into the hopper 45 secured by brackets 46 to the transverse members 7 at one side of the frame. The seat 44 is provided with forwardly extending spaced bars 49, which have hooked terminals 50 which are adapted to be inserted in the spaced openings 51 formed in the plate 52, which extends from the upper longitudinal member 5 to the lower longitudinal member 6 and is secured to the same by suitable bolts or the like 52$^a$. The hooked ends 50 formed on the bars 49 form means, whereby the seat may be readily raised and lowered. The seat is held in its raised position by means of a leg 53 hingedly secured by means of the ordinary hinge 54 to the lower surface of the seat. The leg 53 is formed of a pair of sections 55 and 56 so that the height of the leg may be readily raised or lowered so as to accommodate persons of various sizes. The sections 55 and 56 of the leg 53 are slidably connected together by means of cuffs 57 and a suitable bolt 58 extends through registering apertures 59 formed in the sections so that the same may be held in the adjusted position.

A receptacle 60 is secured to the rear upper longitudinally extending member 5 and is adapted to receive a ball of binding twine 61 which has the free end thereof held by the spring finger 63 of the loop mechanism 64, which will be hereinafter more fully described. The loop mechanism 64 includes a hollow cylindrical casing 65 secured by suitable brackets 66 and 67 to the forward face of the table and the casing 65 slidably receives an operating rod 68 which has its upper end provided with the head 69, which will be hereinafter more fully described. The lower end of the operating rod 68 is positioned in a slot 70 formed in the free end of the foot lever 71, which is formed of suitable resilient metal and is secured at its rear end to the lower transverse brace 7 of the table, as at 72. The foot lever 71 has its upper end bent upwardly and secured to the upper transverse brace as at 73. Thus, on the pressing of the outer end of the foot lever the rod will be forced downward in the casing 65. The rod is held in position on the foot lever 71 by means of the retaining nuts 74 which engage the upper and lower surfaces of the lever. A portion of the rod is formed noncircular in cross section and the hand operating lever 75 slidably receives said noncircular portion so that upon movement of the hand lever, the rod will be turned in the casing and still permit of sliding movement therein. The casing is slotted intermediate its ends as at 76 so as to permit the turning of the hand lever. The head 69 of the operating rod 68 is provided with a pair of spaced upstanding ears 77, and the spring finger 63 is adapted to coöperate with one of the ears so as to hold the free end of the binding cord 61 in position during the husking of the corn. The spring finger 63 extends at an agle to the ears 77 so that the binding cord may be firmly wedged into position and to spring the finger 63. One of the ears 77 is provided with an aperture 78 which slidably receives the cylindrical portion 79 of the cord retaining member 80, which includes a flat shank portion 81 extending downwardly at an angle to the cylindrical portion 79. The flat shank portion is riveted or otherwise secured to the head 69 and owing to the inherent resiliency of the metal, the same normally tends to spring the cylindrical portion away from the spaced ears 77.

After the ears of corn have been removed from the stalks and the stalk receiving members 13 have been depressed by the weight of the same, a loop is formed in the free end of the binding cord by the loop mechanism 64. When it is desired to form the loop, the hand lever 75 is turned, so as to swing the head 69 in a half circle, and the free end of the cord is then brought under and over the portion of the cord lying under the stalk and placed in between the ears 77. The foot lever is then depressed, which draws the head 69 inwardly and the cylindrical portion 78 of the spring member 80 is forced inwardly and holds the cord in position and the ends of the cord are then drawn upwardly. The foot is then released from the pedal which permits the head 69 to ride out of the casing and thus allow the spring finger 80 to resume its normal position and allow the loop to be removed from the head.

An auxiliary cord 84 is provided for holding the fodder tight, while the same is being tied with the binding cord 61 and the auxiliary cord 84 is attached at one end to the upper forward longitudinal member 5 and has its opposite end positioned between the U-shaped member 16 and the rear longitudinal bar 5 and the cord does not come in engagement with the fodder until it is desired to bind the same, at which time the free end of the cord is moved from between the U-shaped member and the rear longitudinal bar 5 and drawn over the stalks and pulled tightly around the same. The free end is then secured in the notched portion 85 of the supporting plate 52. The auxiliary cord 84 is provided with a plurality of spaced knots which are adapted to fit in the notched portions 85 so that the auxiliary binding cord may be held in any adjusted position. When the fodder has been tightly held by the auxiliary binding cord 84, the binding cord 61 is grasped adjacent to the receptacle 60 and the cord is pulled forwardly and over the bundle of corn talks, and severed by means of the sharpened edge 85′ formed on the lower surface of the upper bracket 67, which has one end thereof struck out from the upper longitudinal member 5, as at 86. The free end of the cord is then inserted through the loop and drawn tightly around the bundle and securely tied with the hands and the bundle is then removed from the holders 13. The free end of the cord is then placed between the spring finger 63 and one of the ears 77 and the table is again ready for receiving another load of fodder.

From the foregoing description, it can be seen that an improved corn husking table is provided, in which the corn stalks can be readily fed to the table in convenient position so that the ears can be readily removed from the husks and so that the stalks can be readily bound into shocks, after the ears have been removed.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A corn husking table including a frame, pivoted corn stalk receiving arms carried by the upper ends of said frame, and resilient means for normally holding the arms in raised position.

2. A corn husking table including a frame, arms carried by the upper ends of the frame and extending across the same, means pivotally securing the forward ends of the arms to the frame, and spring means normally holding the arms in a horizontal position.

3. A corn husking table including a frame, arms carried by the upper end of the frame and extending across the same, means pivotally securing the forward ends of the arms to the frame, a contractile coil spring secured to the forward ends of the arms in advance of the pivots, and means for adjusting the tension of said springs.

4. In a corn husking table, a frame including front and rear members, bars connecting the members together, arms pivotally mounted upon opposite ends of the frame for receiving the corn stalks, means yieldably supporting the arms and a pivoted and detachable seat carried by the forward member.

5. A corn husking table comprising front and rear members, transverse bars connecting the members together, pivoted arms carried by the forward member and arranged to extend across and engage the rear member, guides carried by the rear member for the free ends of said arms, and spring means normally holding the free ends of the arms in raised position.

6. A corn husking table including a frame, corn stalk receiving arms carried by the frame, and means for feeding the corn stalks to said arms.

7. A corn husking table including a frame, corn stalk supporting arms carried by said frame, and an inclined corn stalk receiving member arranged to feed the corn stalks to said corn stalk supporting arms.

8. A corn husking table including a frame, corn stalk supporting arms carried by said frame, a chute arranged to feed the corn stalks to said arms, and means for varying the inclination of said chute.

9. A corn husking table including a frame, arms carried by the frame for receiving corn stalks, and a detachable chute arranged to engage the frame for feeding the corn stalks to said arms.

10. A corn husking table including a frame, corn stalk receiving arms carried by the frame, an inclined chute arranged to detachably engage the table, means for varying the inclination of the chute in relation to the table, and means for adjusting the length of said chute.

11. A corn husking table including a frame, corn stalk receiving arms carried by the frame, an inclined chute arranged to detachably engage the table, means for varying the inclination of the chute in relation to the table, and means for adjusting the length of said chute.

12. A corn husking table including a frame having a pair of yieldably supported corn stalk receiving arms, a chute detachably connected with the table, and means carried by the chute for holding one end of the same in elevated position when the chute is connected to the table.

13. A corn husking table including a frame, a chute including a pair of longitudinally extending members, hooks formed on the forward ends of the members for engaging the table, and a pivoted leg carried by the rear ends of the longitudinal members for holding the chute in elevated position when the same is attached to the table.

14. A corn husking table including a frame, a chute including a pair of extensible longitudinal members, transverse members connected to the longitudinally extending members, hooks formed on the forward ends of the longitudinal members, and legs pivotally carried by the rear ends of the longitudinally extending members, as and for the purpose specified.

15. A corn husking table including a frame having a substantially U-shaped member secured thereto, a chute including a pair of longitudinally extending members having hooks formed on the forward ends thereof arranged to detachably engage said U-shaped member, and an extensible leg carried by the rear end of said longitudinally extending members for holding the rear end of the chute in elevated position when the same is connected to the table, as and for the purpose specified.

16. A bundle forming device including a frame, pivoted arms carried by the frame and arranged to receive the bundle, means for holding the free end of a binding cord, and an auxiliary temporary binding cord arranged to hold a bundle in bound position while the same is being bound by the binding cord.

In testimony whereof I affix my signature in presence of two witnesses.

ROBERT THOMPSON.

Witnesses:
HARRY M. WALTERS,
JOHN LAWN.